J. R. C. SMITH.
SPEED INDICATOR.
APPLICATION FILED SEPT. 13, 1919.
1,377,636.
Patented May 10, 1921.
5 SHEETS—SHEET 3.
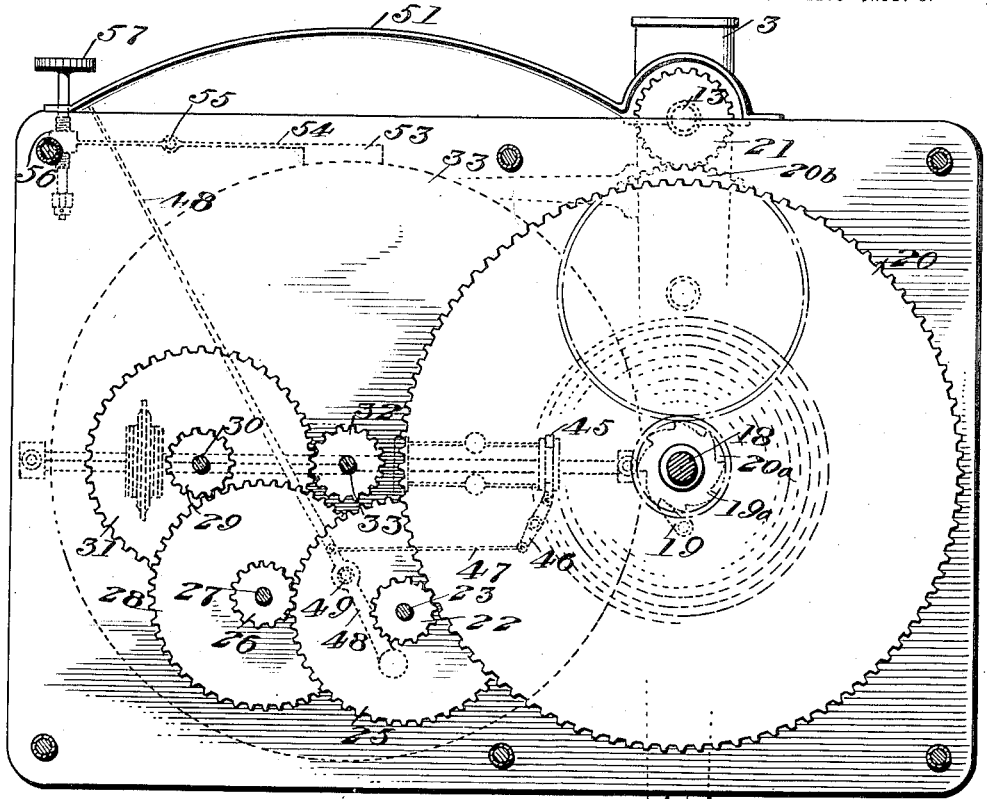
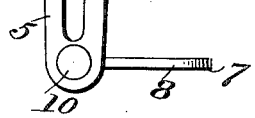
Fig. 6.
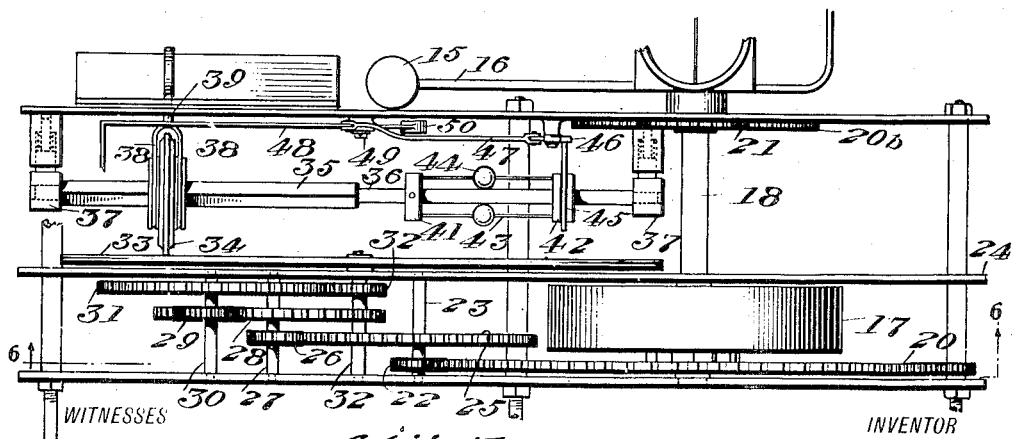
Fig. 7.
WITNESSES
INVENTOR
J. R. CRISPIN SMITH,
BY
ATTORNEYS

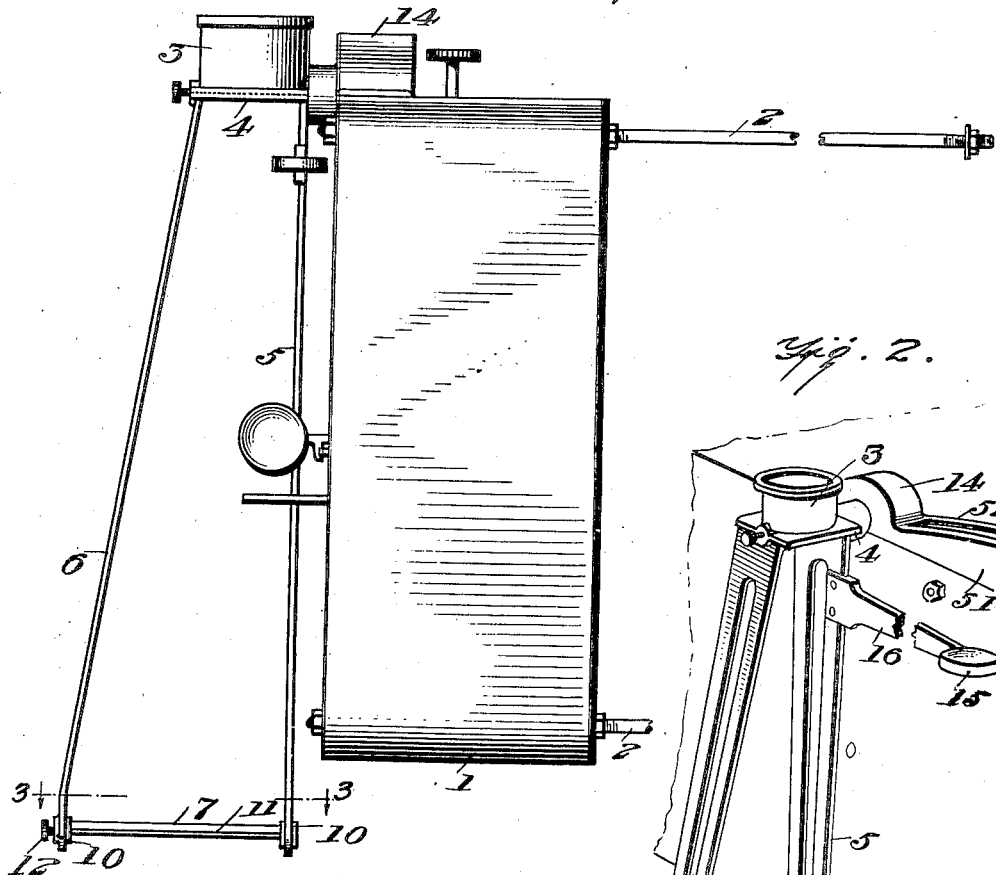
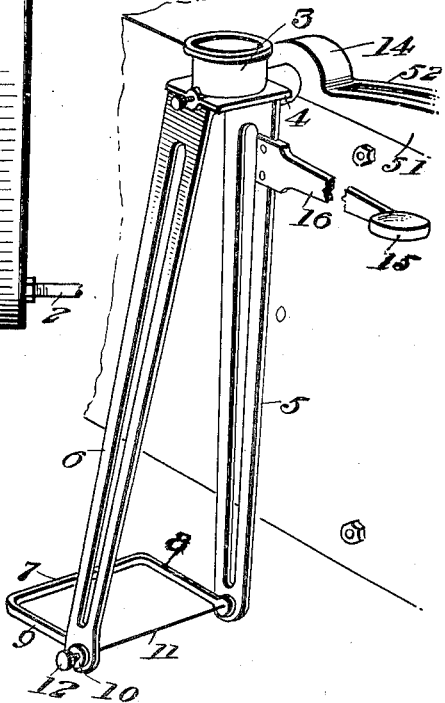
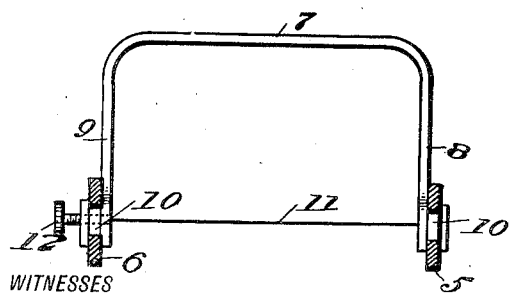

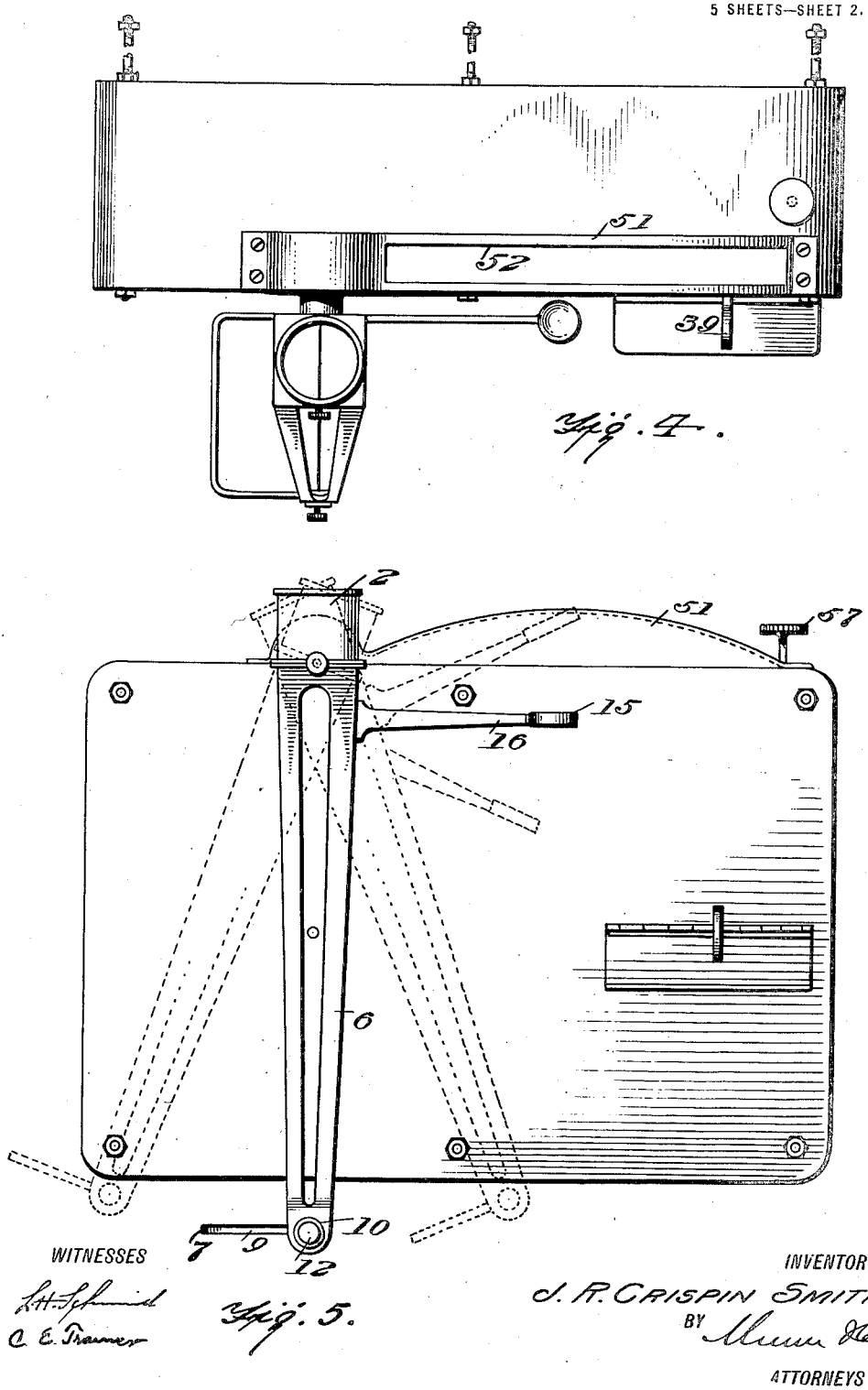

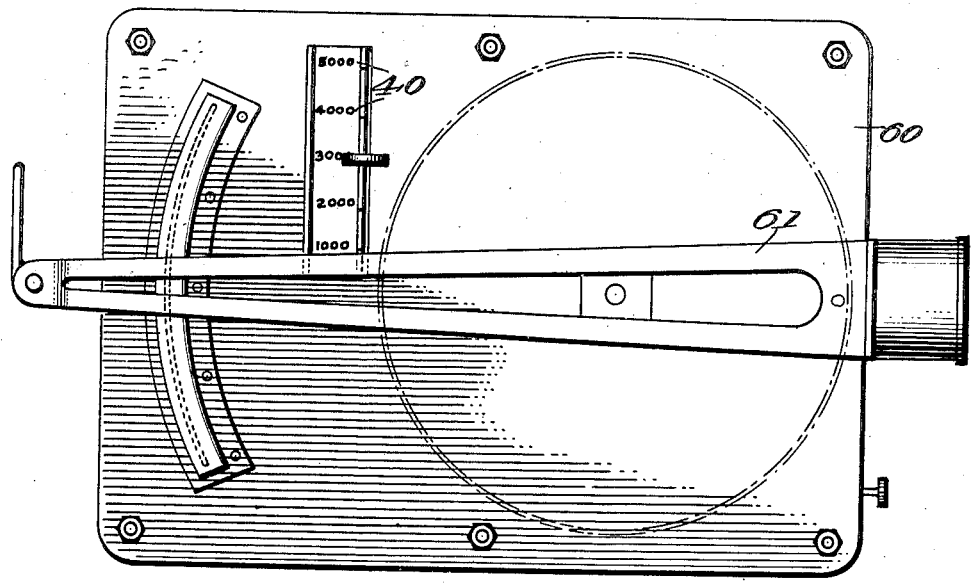
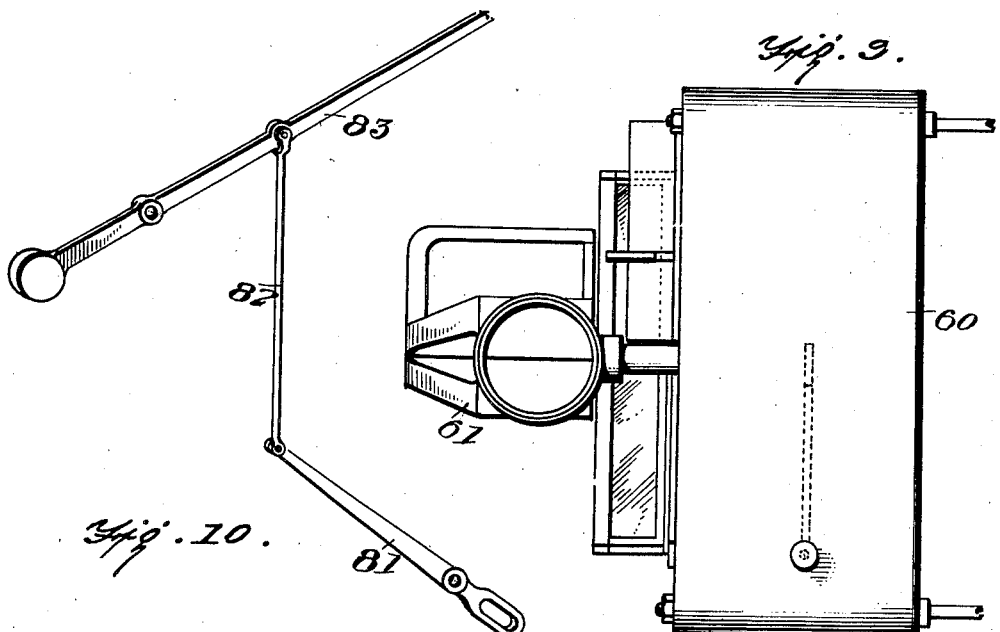

J. R. C. SMITH.
SPEED INDICATOR.
APPLICATION FILED SEPT. 13, 1919.

1,377,636.

Patented May 10, 1921.
5 SHEETS—SHEET 5.

WITNESSES

INVENTOR
J. R. CRISPIN SMITH,
BY
ATTORNEYS

UNITED STATES PATENT OFFICE.

JOHN REGINALD CRISPIN SMITH, OF VICTORIA, BRITISH COLUMBIA, CANADA.

SPEED-INDICATOR.

1,377,636. Specification of Letters Patent. Patented May 10, 1921.

Application filed September 13, 1919. Serial No. 323,671.

*To all whom it may concern:*

Be it known that I, JOHN R. CRISPIN SMITH, a subject of the King of Great Britain, and a resident of Victoria, in the Province of British Columbia and Dominion of Canada, have invented certain new and useful Improvements in Speed-Indicators, of which the following is a specification.

My invention is an improvement in speed indicators, and has for its object to provide a device of the character specified, especially adapted for use with aerial or marine vessels, for measuring and indicating the velocity of the moving object with respect to the fixed object, wherein a sighting device is provided, motor operated to swing in one direction and controllable through a brake to regulate the speed of swinging to enable the observer to retain the sighting device on the fixed object, and indicating mechanism controlled by the swinging of the sighting device for indicating the speed of movement of the moving object, and wherein the relative speed of the arm and the recording mechanism is capable of being varied in accordance with the altitude or with the range, that is, in accordance with the distance of the movable object from the fixed object.

In the drawings:

Figure 1 is a front view of the improved speed indicator;

Fig. 2 is a perspective view of the sighting device;

Fig. 3 is a section on the line 3—3 of Fig. 1;

Fig. 4 is a top plan view;

Fig. 5 is a side view;

Fig. 6 is a section on the line 6—6 of Fig. 7;

Fig. 7 is a top plan view of the motor and gear train;

Fig. 8 is a view similar to Fig. 5, showing another embodiment of the invention;

Fig. 9 is a top plan view of the construction shown in Fig. 8;

Fig. 10 is a perspective view of the indicator lever and its connections;

Figure 11:
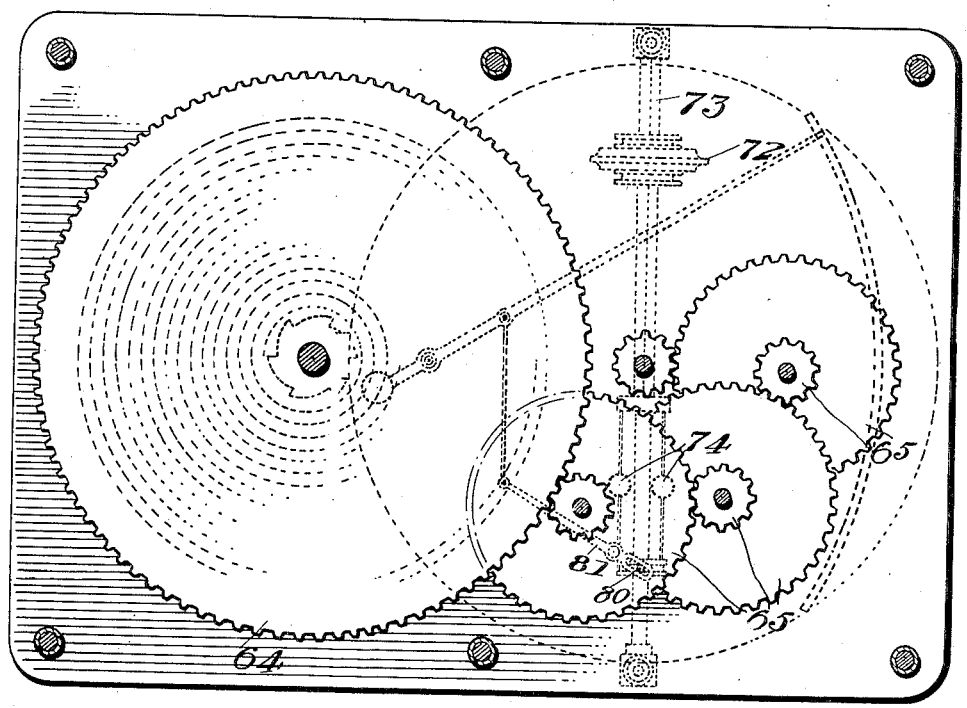
Fig. 11 is a section on the line 11—11 of Fig. 12.

In the embodiment of the invention shown in Figs. 1 to 7, inclusive, the improved speedometer comprises a suitable case 1 in which is mounted the motor and the elements controlled thereby and controlling said motor, and the said casing has threaded rods 2 in connection therewith, by means of which it may be connected to the moving object, as, for instance, the aerial vessel.

A sighting device is mounted to swing on the casing. This apparatus comprises an eye piece 3 which is connected to a base 4 and from the ends of the base legs 5 and 6 depend. The leg 5 is perpendicular, but the leg 6 inclines outwardly, and they are connected at their lower ends by a yoke comprising a body 7 and arms 8 and 9.

Each of these arms 5 and 6 has an opening in its lower end for receiving a headed pin 10 on the adjacent arm of the yoke 7—8—9, the heads of the pins engaging outside of the arms 5 and 6. A cross wire 11 has one end connected with the arm 8 of the yoke and the other arm is connected with a set screw 12 threaded through the pin 10 in order that the cross wire may be tightened when desired.

To sight through the sighting device the eye is placed at the eyepiece and the cross wire is registered with the fixed object. The sighting device is secured to a shaft 13 which is journaled in a bearing 14 on the top of the case, and a motor, to be described, is provided for turning said shaft to swing the sighting apparatus, the motor being within the casing.

The sighting apparatus may be swung in one direction by means of a fingerpiece 15 on an arm 16 extending laterally from the leg 5, as indicated in dotted lines in Fig. 5. The motor is a spring 17 on a shaft 18, the spring having one end connected with the shaft and the other with the case in the usual manner. The spring is held from reverse rotation by a pawl 19 which engages a ratchet wheel 19[a] on the shaft, and the spring drives a gear train as well as swinging the shaft 13. A gear wheel 20[a] is secured to the shaft and meshes with a wheel 20[b] which, in turn, meshes with a pinion 21 on the shaft 13. The gear wheel 20[b] is an idler and a second gear wheel 20 is secured to the shaft 18 at the opposite end from the pinion 20[a]. The gear wheel 20 meshes with a pinion 22 on a shaft 23 journaled in the case, between one wall thereof and a partition plate 24. This shaft 23 has a gear wheel 25 which meshes with a pinion 26 on a second shaft 27 journaled parallel with the shaft 23. The shaft 27 has a gear wheel 28 which meshes with a pinion 29 on a shaft 30 parallel with the shaft 27, and this shaft 30 carries a gear wheel 31 which meshes with a pinion 32 on a shaft 33 also parallel with the shafts 22 and 27.

A friction disk 33 is secured to the shaft 32, and the face of this disk remote from the gear train is engaged by a friction wheel 34 mounted to slide on the square portion 35 of a shaft 36 which is journaled in bearings 37 on the wall of the case. This wheel is engaged by the arms 38 of a fork whose body 39 carries a fingerpiece extending through a slot in the casing wall, and adjacent to this slot is arranged a scale or scales 40 bearing numerals indicating altitude. The arrangement is such that the relative speed of the shaft 36 and the shaft 18 may be varied in accordance with the height from the ground, that is, in accordance with the distance from the fixed object.

The shaft 36 carries a governor composed of a fixed collar 41 and a movable collar 42 connected therewith by means of flexible links 43, each of which carries a ball weight 44 intermediate its ends. It will be obvious that the faster the shaft 36 rotates the farther out from the shaft the weights will be thrown and the nearer the collar 42 will move toward the fixed collar 41. This collar 42 has a ring or fork 45 engaged in an annular groove in the same, and the collar is connected with one end of a lever 46 pivoted intermediate its ends to the casing.

The other end of the lever 42 is connected by a link 47 with a lever 48 pivoted at 49 on the case. This lever 48 is an indicating hand, the said lever being pivoted near one end and the said end is counterweighted as shown at 50. The other end extends through a slot in the top of the casing into an auxiliary casing 51 arranged on the top of the main casing 1, and having an opening 52 in its top which is normally closed by a sheet of transparent material as, for instance, glass.

A scale is arranged adjacent to this sheet and the adjacent end of the lever coöperates with the scale as an indicator to indicate the speed of the swinging movement of the sighting device, and the consequent speed of the vessel. Referring to Figs. 5 and 6 especially, it will be noticed that the top of the auxiliary casing 51 is arched to permit the free swinging of the indicator or lever.

Breaking mechanism is provided for controlling the speed of movement of the disk 33. The said mechanism comprises a brake shoe 53 which is mounted on one end of a lever 54 pivoted intermediate its ends, as indicated at 55, in the case. The outer end of this lever has a nut 56 through which is threaded a screw 57 journaled in the case, and it will be obvious that by turning the screw in the proper direction the pressure on the disk and the consequent speed of the swinging movement of the sighting device may be nicely regulated.

The operation of the improved speedometer is as follows:

When it is desired to measure the speed the altitude is first ascertained from an altimeter and the fingerpiece on the body of the fork 38—39 is moved to that calibration on the scale which indicates the altitude. This makes the proper connection between the shafts 18 and 36. When now the sighting device is swung to the right of Fig. 6 or to the left of Fig. 5, the spring 17 is wound up, that is, is placed under tension, and it is held from reverse rotation by the pawl and ratchet mechanism. When the sighting device is released, the observer has the fixed object in line through the coöperation of the eye piece and the cross wire, and he permits the sighting device to swing under the influence of the spring in such manner that the fixed object will be retained in line during the swinging movement of the sighting device. This swinging may be nicely regulated by the brake and the movement of the lever 48 will indicate the speed at which the movable object is moving.

The embodiment of the invention shown in Figs. 8 to 12, inclusive, is especially adapted for use with marine vessels, the sighting device swinging in a horizontal plane instead of in a vertical plane. The improvement comprises a case 60 similar to the case 1 and the sighting apparatus indicated generally at 61 is the same as that shown in Figs. 1 to 7. This sighting apparatus is secured to the case. The spring pawl ratchet and brake are omitted, the shaft 62 being direct connected to universal or other suitable joint which in turn is connected to a tripod or other suitable mounting. The motive power in this case required to drive the mechanism being supplied by the operator who by directing the instrument on the object, the relative speed of which it is wished to determine, by means of handles, gives the action requisite to drive the mechanism.

The shaft 62 carries a gear wheel 64 which drives a gear train indicated generally at 65, and the gear train drives a shaft 70 which has secured thereto a friction disk 71 corresponding to the disk 33 of Figs. 1 to 7. The face of this disk is engaged by a friction wheel 72 on a shaft 73 corresponding to the shaft 36 of Figs. 1 to 7, and carrying a similar governor indicated at 74. The friction wheel 72 is moved by a fingerpiece 75 connected with a yoke 76 whose arms engage over the shaft on opposite sides of the wheel. This fingerpiece carries an indicator 77 which coöperates with a scale on an angle plate 78 secured to the outer face of the casing for enabling the friction wheel to be set with respect to the disk 71 to correspond with the range.

Figure 12:
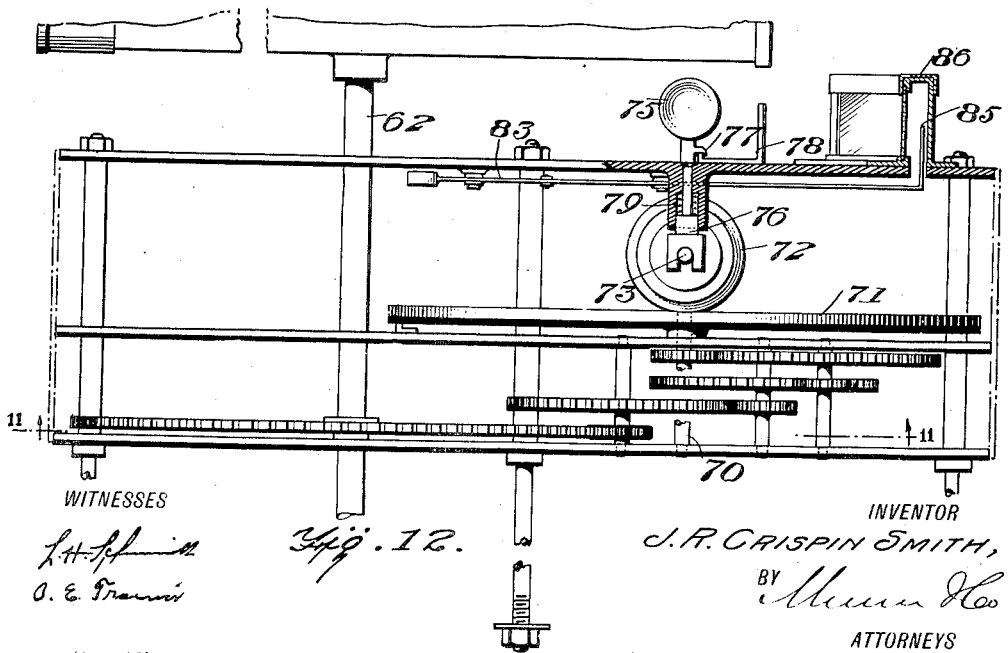
Fig. 12 is a top plan view, with parts in section, of the motor and its connections.

Referring to Fig. 12, it will be noticed that the yoke 76 is pressed toward the shaft 73 by a coil spring 79. The movable collar of the governor has a pin 80 which engages a slot in one end of a lever 81 pivoted on the case intermediate the ends of the lever and having that end remote from the slot connected by a link 82 with an indicator arm or notch 83 corresponding to the arm 48 of Figs. 1 to 7. This indicator has at its free end an angular lug 85 which extends through an arc shaped slot in the casing wall into an auxiliary casing 86 of arc shape secured to the wall of the casing 1. This casing 86 has its concave wall transparent, as shown, and a suitable scale is provided with which the lug 85 coöperates to indicate the speed.

The operation of this embodiment of the invention is similar to that embodied in Figs. 1 to 7 with the exception that in the instrument shown in 1 to 7 the sighting device is rotated by a spring while the case remains stationary, whereas in this instrument the case is rotated by hand with the sighting arm which is attached to it, while the shaft 62 remains stationary.

I claim:

1. A device of the character specified comprising a case, a sighting device mounted to swing on the case, a spring controlled motor in the case and connected with the arm to swing the same in one direction, a friction disk driven by the motor, manually controlled means for controlling the speed of the disk, a shaft journaled diametrically of the friction disk, a friction wheel feathered on the shaft to move longitudinally thereof and contacting with the face of the disk, means for moving the wheel, a centrifugal governor driven by the shaft, an indicator arm controlled by the movement of the governor, a scale with which the arm coöperates, and a scale for indicating the position of the wheel.

2. A device of the character specified comprising a case, a sighting device mounted to swing on the case, a spring controlled motor in the case and connected with the arm to swing the same in one direction, a friction disk driven by the motor, manually controlled means for controlling the speed of the disk, a shaft journaled diametrically of the friction disk, a friction wheel feathered on the shaft to move longitudinally thereof and contacting with the face of the disk, means for moving the wheel, an indicator arm or needle controlled by the speed of movement of the shaft for indicating the speed of the swinging of the sighting device, a scale with which the arm coöperates, and a scale for indicating the position of the wheel.

3. A device of the character specified comprising a case, a sighting device mounted to swing on the case, a spring controlled motor in the case and connected with the arm to swing the same in one direction, a friction disk driven by the motor, manually controlled means for controlling the speed of the disk, a shaft journaled diametrically of the friction disk, a friction wheel feathered on the shaft to move longitudinally thereof and contacting with the face of the disk, means for moving the wheel, means controlled by the speed of movement of the shaft for indicating the speed of the swinging of the sighting device, and a scale for indicating the position of the wheel, the spring of the motor being tensioned by the swinging of the sighting device in the opposite direction.

4. A device of the character specified comprising a case, a sighting device mounted to swing on the case, a spring controlled motor in the case and connected with the arm to swing the same in one direction, a friction disk driven by the motor, manually controlled means for controlling the speed of the disk, a shaft journaled diametrically of the friction disk, a friction wheel feathered on the shaft to move longitudinally thereof and contacting with the face of the disk, means for moving the wheel, means controlled by the speed of movement of the shaft for indicating the speed of the swinging of the sighting device, and a scale for indicating the position of the wheel.

5. A device of the character specified comprising a sighting arm, means for supporting said arm for swinging movement to permit it to follow a fixed object while supported on a moving object, a spring controlled motor for swinging said arm in one direction, the swinging of the arm in the opposite direction controlling the tensioning of the spring, a friction disk driven by the motor, a governor shaft, means for connecting the governor shaft to the face of the friction disk at variable distances from the center thereof to vary the relative speed of the disk and shaft, means controlled by the movement of the governor shaft for indicating the speed of the swinging movement of the sighting arm under the influence of the motor, and means controllable at will for braking the action of the friction disk.

6. A device of the character specified comprising a sighting arm, means for supporting said arm for swinging movement to permit it to follow a fixed object while supported on a moving object, a motor for swinging said arm in one direction, a friction disk driven by the motor, a governor shaft, means for connecting the governor shaft to the face of the friction disk at variable distances from the center thereof to vary the relative speed of the disk and shaft, means controlled by the movement of the governor shaft for indicating the speed of the swinging movement of the sighting arm under the influence of the motor, and means controllable at will for braking the action of the friction disk.

7. A device of the character specified comprising a sighting arm, means for supporting the arm for swinging movement, a motor for swinging the arm, means controllable at will for directing the action of the motor to control the swinging of the arm, an indicating device driven by the motor, and means for varying the relative speed of the motor and the indicator with the distance of the arm from the object which the arm is to follow.

8. A speed indicating mechanism comprising a sighting arm, means for swinging the arm, means for braking the movement of the arm and controllable at will to permit the arm to be held upon a fixed object, an indicator, a connection between the indicator and the arm swinging means for controlling the indicator, said connection being variable in accordance with the distance of the fixed object from the swinging arm.

9. A speed indicating mechanism comprising a sighting arm, means for swinging the arm, means for braking the movement of the arm and controllable at will to permit the arm to be held upon a fixed object, an indicator, and a connection between the indicator and the arm swinging means for controlling the indicator.

10. A speed indicating mechanism comprising a sighting arm, means for swinging the arm, an indicator controlled by the arm swinging means to indicate the speed of movement of the arm, and means for controlling the movement of the arm to permit it to be held upon a fixed object.

JOHN REGINALD CRISPIN SMITH.